United States Patent
Cannon et al.

(10) Patent No.: US 8,265,083 B1
(45) Date of Patent: Sep. 11, 2012

(54) SYSTEMS AND METHODS OF PROVIDING COMMUNICATIONS SERVICES

(75) Inventors: Eugene Peter Cannon, Red Bank, NJ (US); Ka-yui Kevin Ma, North Brunswick, NJ (US); John R Erickson, Freehold, NJ (US)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/244,827

(22) Filed: Sep. 26, 2011

Related U.S. Application Data

(60) Provisional application No. 61/512,265, filed on Jul. 27, 2011, provisional application No. 61/529,742, filed on Aug. 31, 2011.

(51) Int. Cl.
*H04L 12/28* (2006.01)
*H04L 12/56* (2006.01)

(52) U.S. Cl. .......... 370/395.52; 370/351; 370/352; 370/353; 370/354; 370/355; 370/356; 370/395.3; 370/395.5; 370/401; 455/410; 455/411; 455/406; 455/433; 455/435.1; 455/445; 709/227; 709/228; 709/229; 709/238; 379/88.17; 379/88.2; 379/88.25; 379/220.01; 379/219

(58) Field of Classification Search .......... 455/406, 455/407, 408, 552.1, 409, 410, 411, 433, 455/435.1, 435.2, 445; 370/351–356, 395.3, 370/395.5, 395.52, 338, 401; 709/227, 228, 709/229, 238; 379/88.17, 88.25, 220.01, 379/219, 88.2

See application file for complete search history.

(56) References Cited

U.S. PATENT DOCUMENTS

| | | | | |
|---|---|---|---|---|
| 6,141,341 | A * | 10/2000 | Jones et al. | 370/352 |
| 7,280,535 | B1 * | 10/2007 | Bergman et al. | 370/354 |
| 7,751,347 | B2 * | 7/2010 | Giroti | 370/260 |
| 7,907,550 | B1 * | 3/2011 | Chu et al. | 370/260 |
| 7,990,912 | B2 * | 8/2011 | Nix et al. | 370/328 |
| 2005/0239496 | A1 * | 10/2005 | Sylvain | 455/552.1 |
| 2007/0049245 | A1 * | 3/2007 | Lipman | 455/406 |
| 2008/0056235 | A1 * | 3/2008 | Albina et al. | 370/352 |
| 2008/0137642 | A1 * | 6/2008 | Teodosiu et al. | 370/352 |
| 2008/0205414 | A1 * | 8/2008 | Katz et al. | 370/401 |
| 2011/0286443 | A1 * | 11/2011 | Wu et al. | 370/352 |

* cited by examiner

*Primary Examiner* — Olumide T Ajibade Akonai
(74) *Attorney, Agent, or Firm* — Nixon & Vanderhye P.C.; Joseph Pagnotta

(57) ABSTRACT

An IP telephony system allows users of the IP telephony system to register extension telephony devices with the IP telephony system. An extension telephony device is one that is provided with service by a separate telephony service provider. Once an extension telephony device is registered, a user can obtain communications services from the IP telephony system using the extension telephony device. A extension telephony device may be tied to a user's main telephony services account with the IP telephony system such that when the user obtains communications services from the IP telephony system using an extension telephony device, the user will be billed for those communications services through the user's main account.

30 Claims, 7 Drawing Sheets

SYSTEMS AND METHODS OF PROVIDING COMMUNICATIONS SERVICES

This application claims priority to the filing dates of Provisional Application No. 61/512,265, filed Jul. 27, 2011, and Provisional Application No. 61/529,742, filed Aug. 31, 2011, the contents of both of which are incorporated herein by reference.

BACKGROUND OF THE INVENTION

The invention is related to Internet protocol (IP) telephony systems that allow users to place and receive telephone calls, and to send and receive text and video messages via data packets that are communicated over a data network.

Presently, there are many IP telephony systems that provide telephony services to their users. Typically, a user will register with an IP telephony system to obtain telephony services at their residence or business. As part of the registration process, one or more of the user's telephony devices in their home or business are registered with the IP telephony system.

When the user wishes to place a call or send a text or video message, the user's telephony device contacts a server or a gateway maintained by the IP telephony system over a public and/or private data network. The server or gateway then acts to provide the user with the requested communications services.

IP telephony systems can provide the same types of communications services as traditional telephony service providers that operate through a publically switched telephone network (PSTN), but at significantly lower costs. For this reason, many people have switched their residential and business telephony service provider from a traditional PSTN-based telephony services provider to an IP telephony service provider.

Many users also have a separate mobile or cellular telephone in addition to their residential and business telephones. Although it would be desirable to utilize an IP telephony service provider to obtain certain types of communications services on mobile telephones, doing so is often inconvenient.

Generally, the only way to place international long distance telephone calls through an IP telephony service provider using a mobile telephone is to pre-pay for an IP telephony service that is separate and distinct from the carrier that provides the regular native telephony service to the user's mobile telephone. Once the user has prepaid for a certain amount of minutes, in order to place a telephone call using the IP telephony service, the user must engage in a cumbersome dialing procedure. In order to use the IP telephony service, the user may need to remember a username or account number, as well as a PIN or password.

Thus, although it is possible to obtain lower cost IP telephony services on a mobile telephone, it is not convenient or quick to place calls through the service. Further, the user must engage in a separate financial transaction to obtain minutes of call time on the IP telephony service. Also, if the user has an account with an IP telephony service that is left with only a few minutes of talk time, the user may choose to not use the remaining minutes, meaning some of the money spent to acquire minutes of talk time on the IP telephony system will be lost.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

The technology is related to telephony systems generally. The technology encompasses systems and methods of providing communications services to a user's telephony device that is native to a first telephony system through a second, separate IP telephony system.

In the following description, the terms VOIP system, VOIP telephony system, IP system and IP telephony system are all intended to refer to a system that connects callers and that delivers data, text and video communications using Internet protocol data communications.

Figure 1:
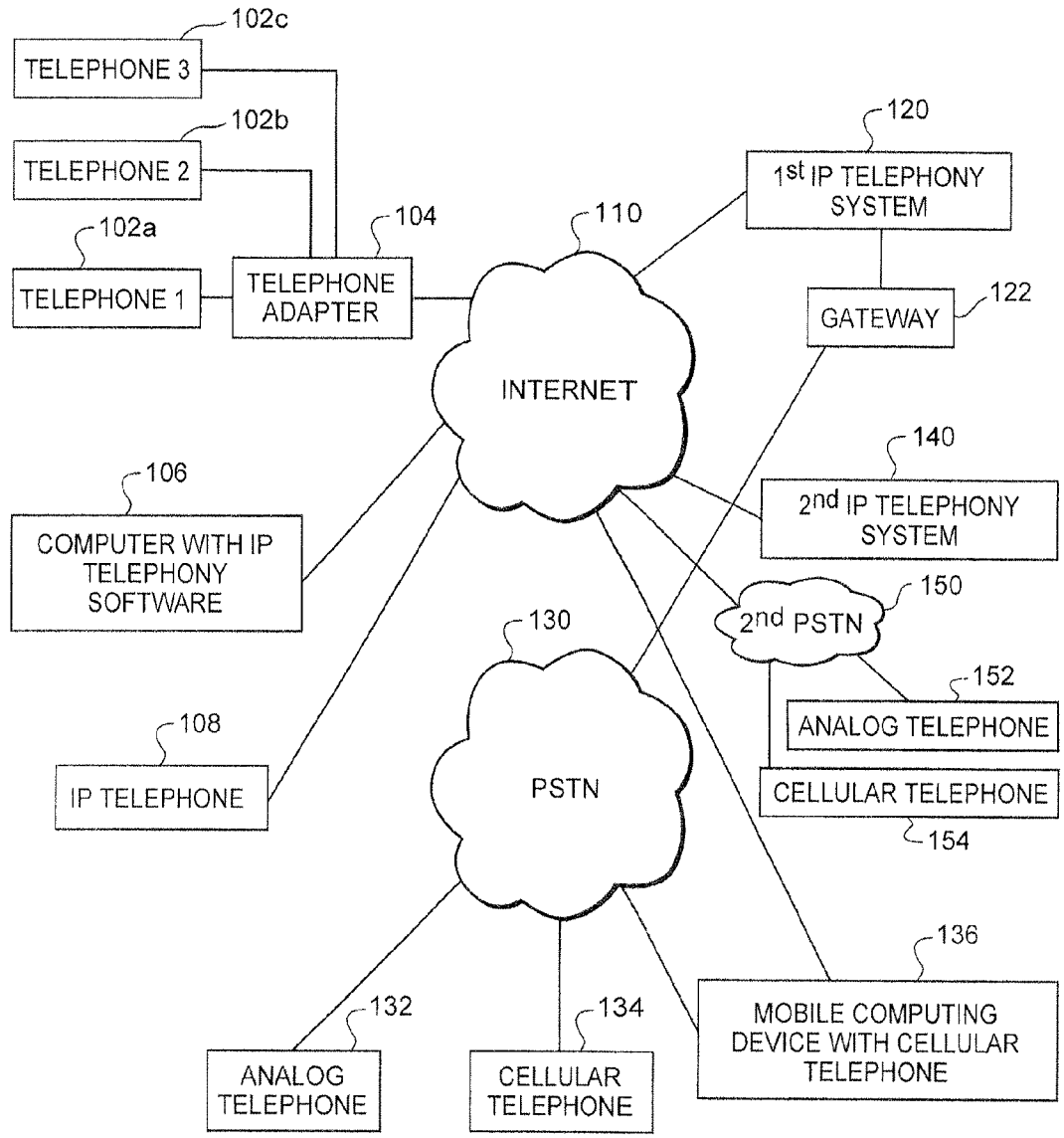
FIG. 1 is a diagram of a communications environment including various elements which are associated with an Internet protocol (IP) telephony system operating in accordance with the invention.

As illustrated in FIG. 1, a communications environment is provided to facilitate IP enhanced communications. An IP telephony system 120 enables connection of telephone calls between its own customers and other parties via data communications that pass over a data network. The data network is commonly the Internet 110, although the IP telephony system may also make use of private data networks. The IP telephony system 120 is connected to the Internet 110. In addition, the IP telephony system 120 is connected to a first publicly switched telephone network (PSTN) 130 via a gateway 122. The first PSTN 130 may also be directly coupled to the Internet 110 through one of its own internal gateways. Thus, communications may pass back and forth between the first IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102*a* which is connected to the Internet 110 via a telephone adapter 104. The telephone adapter 104 converts analog signals from the telephone 102*a* into data signals that pass over the Internet 110, and vice versa. Also, as illustrated in FIG. 1, multiple analog telephone devices 102*a*, 102*b* and 102*c* could all be coupled to the same telephone adaptor 104. Analog telephone devices include but are not limited to standard telephones and document imaging devices such as facsimile machines. A configuration using a telephone adapter 104 is common where all of the analog telephone devices 102*a*, 102*b* and 102*c* are located in a residence or business, and all of the telephone devices are connected to the same telephone adapter. With this type of a configuration, all of the analog telephone devices 102*a*, 102*b*, 102*c* share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 would then route the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In addition, mobile computing devices which include cellular telephone capabilities could also be used to place telephone calls to customers of the IP telephony system. A mobile computing device 136, as illustrated in FIG. 1, might connect to the PSTN 130 using its cellular telephone capabilities. However, such devices might also have the ability to connect wirelessly via some other means. For instance, a mobile computing device 136 might communicate with a wireless data router to connect the mobile computing device 136 directly to a data network, such as the Internet 110. In this instance, communications between the mobile computing device 136 and other parties could be entirely carried by data communications which pass from the mobile computing device 136 directly to a data network 110. Of course, alternate embodiments could utilize any other form of wireless communications path to enable communications.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

FIG. 1 also illustrates that a second IP telephony system 140 may interact with the first IP telephony system 120 via the Internet 110. For example, customers of the second IP telephony system 140 may place calls to customers of the first IP telephony system 120. In that instance, assets of the second IP telephony system 140 interact with assets of the first IP telephony system 120 to setup and carry the telephone call. The same basic thing could happen if customers of the first IP telephony system 120 place calls to customers of the second IP telephony system 140.

FIG. 1 also illustrates a second PSTN 150 that is coupled to an analog telephone 152 and a cellular telephone 154. The second PSTN 150 may also be directly coupled to the Internet 110 through one of its own internal gateways. Thus, communications may pass back and forth between the first IP telephony system 120 and the second PSTN 150 through the Internet 110 via a gateway maintained within the second PSTN 150. Calls from customers of the first IP telephony system 120 may be routed to the analog telephone 152 or the cellular telephone 154 through the second PSTN 154.

For purposes of the following description, we will assume that the first PSTN 130 is located in a first country, and that the second PSTN 140 is located in a second country. Likewise, the analog telephone 132 and cellular telephone 134 coupled to the first PSTN 130 are located in the first country, whereas the analog telephone 152 and cellular telephone 154 coupled to the second PSTN 150 are located in the second country.

Each time that a customer of the IP telephony system 120 places a call or receives a call through the IP telephony system 120, a call detail record (CDR) is established for the call. The CDRs include various items of information about the call. For instance, the information included in a CDR would typically include the telephone number of the calling party, the telephone number of the called party, the time the call was established, the time the call ended, as well as various other items of information relating to the elements of the IP telephony system that handled the call.

Likewise, each time that a customer of the IP telephony system 120 sends or receives a text message, such as a SMS message, a MMS message, a video message and all other forms of communications, a record of the communication is created. The record can be stored along with the records of telephone calls as another CDR, or the record could take some other format.

Figure 2:
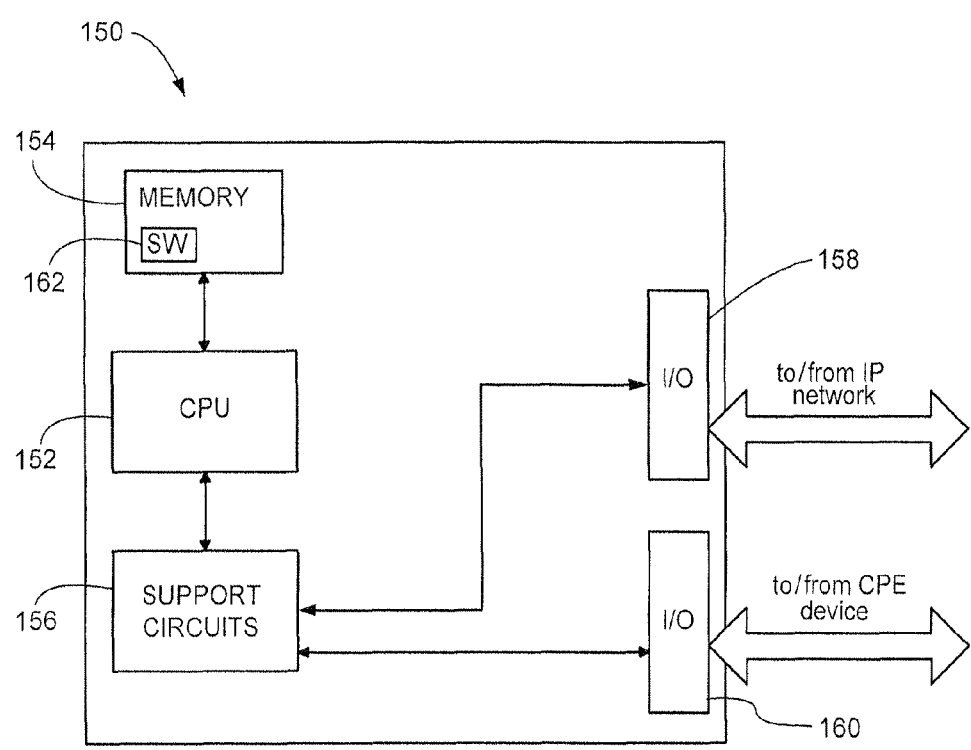
FIG. 2 is a diagram of various elements of a processor that forms part of a IP telephony system.

FIG. 2 illustrates elements of a computer processor 150 that can be used as part of the IP telephony system 120 to accomplish various functions. The IP telephony system 120 could include multiple processors 150 located at various locations in the system, along with their operating components and programming, each carrying out a specific or dedicated portion of the functions performed by the VOIP based telephony service 120.

The processor 150 shown in FIG. 2 may be one of any form of a general purpose computer processor used in accessing an IP-based network, such as a corporate intranet, the Internet or the like. The processor 150 comprises a central processing unit (CPU) 152, a memory 154, and support circuits 156 for the CPU 152. The processor 150 also includes provisions 158/160 for connecting the processor 150 to customer equipment and to service provider agent equipment, as well as possibly one or more input/output devices (not shown) for accessing the processor and/or performing ancillary or administrative functions related thereto. The provisions 158/160 are shown as separate bus structures in FIG. 2; however, they may alternately be a single bus structure without degrading or otherwise changing the intended operability of the processor 150.

The memory 154 is coupled to the CPU 152. The memory 154, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 156 are coupled to the CPU 152 for supporting the processor in a conventional manner. These circuits include cache, power supplies, clock circuits, input/output circuitry and subsystems, and the like.

A software routine 162, when executed by the CPU 152, causes the processor 150 to perform processes of the disclosed embodiments, and is generally stored in the memory 154. The software routine 162 may also be stored and/or executed by a second CPU (not shown) that is remotely located from the hardware being controlled by the CPU 152. Also, the software routines could also be stored remotely from the CPU. For example, the software could be resident on servers and memory devices that are located remotely from the CPU, but which are accessible to the CPU via a data network connection.

The software routine 162, when executed by the CPU 152, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 162 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software client that enables the device to act as an IP telephone. Thus, a single device might be capable of operating as both a cellular telephone and an IP telephone.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software.

The following description will also refer to telephony communications and telephony activity. These terms are intended to encompass all types of telephone calls, regardless of whether all or a portion of the calls are carried in an analog or digital format. These terms are also intended to encompass data communications that are conveyed through a PSTN or VOIP telephony system, such as facsimile transmissions, text messages, SMS messages, MMS messages, video messages, and all other types of data communications sent by or received by a user. In other words, these terms are intended to encompass any communications whatsoever, in any format, which traverse all or a portion of a communications network or telephony network.

Figure 3:
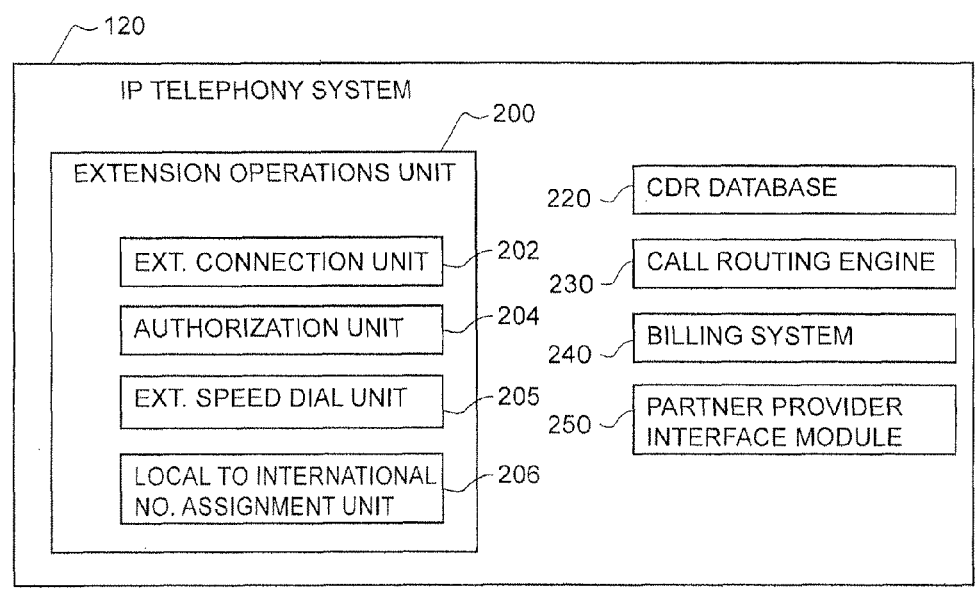
FIG. 3 is block diagram illustrating selected elements of an IP telephony system that is capable of providing telephony services to a telephony device that is native to some other telephony system.

FIG. 3 illustrates elements of an IP telephony system 120. The IP telephony system 120 includes a CDR database 220 which stores records of all the incoming communications sent to each of the users of the IP telephony system 120, as well as all outgoing communications sent by the users. The CDR database 220 includes a record of telephone calls and other types of incoming and outgoing communications, such as text messages, SMS messages, MMS messages, video messages, and other forms of communications.

The IP telephony system 120 also includes a call routing engine 230. The call routing engine 230 provides instructions to servers of the telephony system 120 to help the servers establish communications channels between a calling party and a called party. The call routing engine 230 also helps servers to deliver text messages, SMS messages, MMS messages and other forms of communications.

The IP telephony system 120 further includes a billing system 240. The billing system 240 uses information drawn from the CDR database 220, and possibly other sources, to determine how much to bill the users of the IP telephony system 120.

The IP telephony system 120 also includes a partner provider interface module 250. This module communicates various items of information with partner providers who help to complete telephone calls for the IP telephony system in various locations throughout the world. The same partner providers may deliver incoming calls directed to users of the IP telephony system 120. In some instances, the partner providers may feed information about calls to the IP telephony system 120 via the partner provider interface module 250. This information could be used by the IP telephony system 120 to create CDRs for user calls.

The IP telephony system 120 provides communications services to its registered users through telephony devices that the users have registered with the IP telephony system. For example, and with reference to FIG. 1, assume that a first user who has established an account with the IP telephony system has registered the telephone adaptor 104 with the IP telephony system 120. The IP telephony system 120 will have assigned a first telephone number to the first user's account, and calls to that telephone number will be routed to the telephone adaptor 104.

Likewise, assume that a second user who has an account with the IP telephony system 120 has registered the IP telephone 108 with the IP telephony system 120. The IP telephony system 120 will have assigned a second telephone number to the second user's account, and calls to that number will be routed to the IP telephone 108.

In the following description, and the appended claims, the IP telephony system 120 may be referred to as a telephony system that provides landline type telephony services. This description is intended to distinguish the IP telephony system from a traditional cellular telephone services provider. However, this does not mean that the IP telephony system is incapable of providing telephony services to a mobile or cellular telephone. In fact, quite the opposite is true, as will be explained below.

Next, assume that the first user also possesses the cellular telephone 134. The cellular telephone 134 is registered with a separate, first cellular telephone services provider. Also, assume that the second user possesses the mobile computing device with a cellular telephone 136. The mobile computing device with a cellular telephone 136 is registered with a separate cellular telephone services provider.

An IP telephony system 120 as illustrated in FIG. 3 is capable of providing communications services to a user through both the IP telephony device(s) the user has registered with the IP telephony system 120, and through a telephony device that is registered with and obtains telephony service from a separate telephony services provider. Thus, for example, the first user could obtain telephony services from the IP telephony system 120 using the first user's cellular telephone 132 that is registered with a first cellular telephone services provider. Likewise, the second user could obtain telephony services from the IP telephony system 120 using the mobile computing device 136 that is registered with a second cellular telephone services provider. Further, the IP telephony system 120 will bill the first and second users for telephone calls made using the cellular telephone 134 and mobile computing device 136 as part of their regular monthly bills from the IP telephony system 120.

The IP telephony system 120 allows a user to register additional telephony devices that can act as extensions of the user's main IP telephony device(s). Thus, the first user can register his cellular telephone 134 as an extension telephony device. While incoming telephone calls directed to the first user's assigned telephone number will continue to be routed to the telephone adaptor 104, the first user can place outgoing telephone calls through the IP telephony system using his cellular telephone 134, even though the first user's cellular telephone is provided with cellular telephone service by a separate cellular telephony services provider. This allows the first user to take advantage of the relatively low rates for long distance and international long distance calls that are offered by the IP telephony system 120. Those rates will typically be significantly lower than the rates the first user would be charged by the cellular telephony services provider. In addition, charges for calls made from the first user's cellular telephone 134 that are routed through the IP telephony system 120 will simply appear on the first user's regular monthly IP telephony system bill.

Likewise, the IP telephony system 120 allows the second user to register his mobile computing device 136 as an extension telephony device. While incoming telephone calls directed to the second user's assigned telephone number will continue to be routed to the second user's IP telephone 108, the second user can place outgoing telephone calls though the IP telephony system 120 using his mobile computing device 136, even though the second user's mobile computing device 136 is provided with cellular telephone service by a separate cellular telephony services provider.

As illustrated in FIG. 3, the IP telephony system 120 includes an extensions operating unit 202. The extensions operating unit 202 handles the registration of extension telephony devices, the setup and configuration of dialing aids, and the provision of telephony services to extension telephony devices.

An authorization unit 204 handles the registration of telephony devices as extensions of a user's basic IP telephony service. When a user wishes to register a telephony device as an extension telephony device, the actual registration process could be handled in multiple different ways. In some instances, a user could utilize a website interface to register a telephony device that is native to another telephony service provider as an extension telephony device. In other instances, the user could call a special access number maintained by the IP telephony system 120. This would connect the user to an interactive voice response system that would allow the user to register the extension telephony device. In other instances, a user could call and speak to a customer service representative that would assist with the registration of the extension telephony device.

It still other instances, such as where the extension telephony device is a mobile computing device, the user downloads an application onto the mobile telephony device, and the application handles the registration of the mobile computing device as an extension telephony device. The application might also be used as the interface that allows the user to place telephone calls through the IP telephony system 120.

Regardless of how it is accomplished, during the registration process the IP telephony system 120 obtains a telephone number or some other unique identifier associated with the extension telephony device. In addition, the authorization unit 204 may assign a unique personal identification number (PIN) to the extension telephony device. The user may be asked for the PIN when the user requests services through the IP telephony system 120. In other instances, the same PIN associated with the user's main account with the IP telephony system 120 might be used to authorize the provision of communications services to the user through the extension telephony device.

With reference to the communications environment illustrated in FIG. 1, the first user, whose primary IP telephony device is the telephone adaptor 104, would register his cellular telephone 134 as an extension telephony device. During the registration process, the authorization unit 204 obtains the telephone number associated with the cellular telephone 134. The authorization unit may also assign a PIN number that the user can provide when requesting communications services from the IP telephony system 120 through the cellular telephone 134.

Likewise, the second user would register his mobile computing device 136 as an extension telephony device. During the registration process, the authorization unit 204 could obtain a telephone number associated with the mobile computing device 136, or a unique identification number assigned to the mobile computing device 136, or both. Here again, the authorization unit 204 may assign a PIN number to the mobile computing device 136 that the second user would provide to obtain communications services from the IP telephony system 120 through the mobile computing device 136.

The IP telephony system 120 may allow a user to register one or a predetermined number of extension telephony devices without charge. Any calls placed from the extension telephony device(s) would then incur the same charges as calls made from the user's primary IP telephony device. If the user places a call with an extension device to a telephone number that is part of an unlimited calling plan, no additional charges would apply. If a call is placed with an extension telephony device to a telephone number that would incur a per minute charge, the same rate applies to calls made from the extension telephony device that would apply to calls made from the user's primary IP telephony device.

If the user wants to register additional extension telephony devices beyond the number that can be registered for free, the IP telephony system 120 may charge the user a monthly reoccurring charge for each additional extension device. Paying the monthly reoccurring charge would then entitle the user to obtain communications services through the extension telephony device at the same rates the user would be charged for communications services provided to the user through his primary IP telephony device. Alternatively, the user may be provided with the option of registering additional extension telephony devices without the need to pay a monthly reoccurring charges if the user instead pays per minute fees for calls placed from the additional extension telephony devices.

Also, the IP telephony system 120 could offer the user different pricing options for communications services provided to the user through an extension telephony device than for communications services provided to the user through the user's primary IP telephony device. Regardless, the user would continue to receive one monthly bill for charges incurred for communications services provided to the user through the user's primary IP telephony device and through the user's extension telephony devices.

The IP telephony system 120 could also allow a master account holder to specify a maximum allowable monthly spending limit for each extension telephony device. The master user could set and change those spending limits by interacting with the authorization unit 204 via a web portal, through an interactive voice response system, or using an application loaded on a mobile computing device. Alternatively, the master user could speak with a customer service representative to have the maximum spending limits set or changed.

When a user wishes to place a call from an extension telephony device, the user would place a call to a local access telephone number or to a toll free access number. The basic process is illustrated in FIG. 4.

Figure 4:
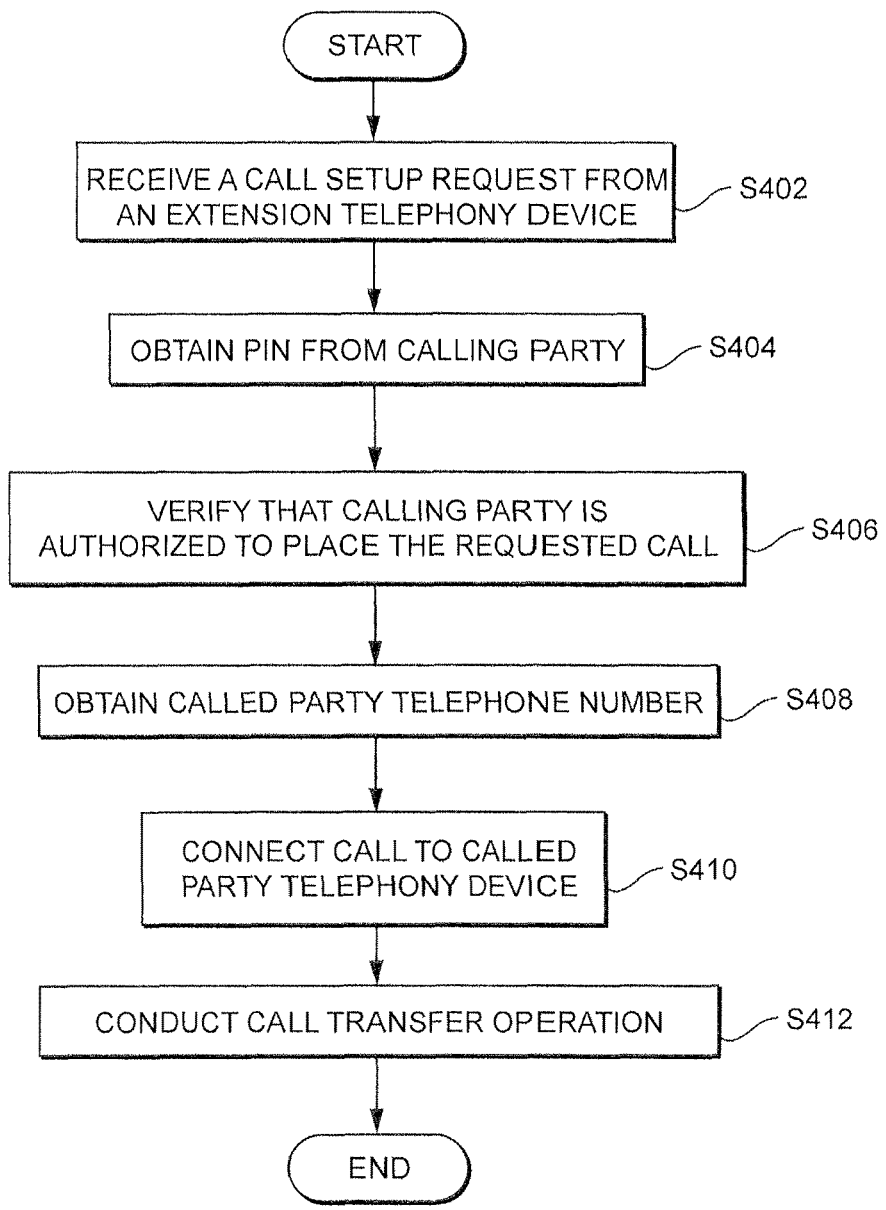
FIG. 4 is diagram illustrating steps of a method of providing telephony services to a telephone that is native to a first telephony system with elements of a second telephony system.

As shown in FIG. 4, the method would begin when a user utilizes an extension telephony device to place a call to a local access number or to a toll free access number. This call would be made using the extension telephony device's native telephony service provider. In some instances, such as where the extension telephony device is a mobile computing device running an application, the call could be placed entirely through a data network. In step S402, the call would be received by the extension connection unit 202 of the extension operations unit 200 of the IP telephony system 120 illustrated in FIG. 3.

The extension connection unit 202 obtains the telephone number of the extension telephony device through the caller ID information provided as part of the incoming call. Alternatively, the call may be placed to the access telephone number from a mobile computing device that is running an application provided by the IP telephony system 120. Such a call could be established by the application between the mobile computing device and the extension connection unit 202 entirely over a data network, such as the Internet. In that instance, the application may send a unique identifier assigned to the user's mobile computing device, instead of a telephone number. Regardless, the telephone number or unique identification number associated with the extension telephony device will be recognized because the user will have already registered the extension telephony device.

In step S404, the extension connection unit 202 asks the user to provide a PIN that is associated with the extension telephony device, or with the user's main account with the IP telephony system. This information could be provided to the extension connection unit in multiple different ways. It could be provided by the user pressing buttons on a keypad of the extension telephony device. Alternatively, the user might speak the information. In other instances, such as where an application is running on a mobile computing device, a query could be sent to an application running on the device, and the application could automatically provide the PIN information without further user intervention. Regardless, the extension connection unit 202 would acquire the information, and/or interpret any spoken responses using speech recognition assets.

In step S406, the extension connection unit 202 verifies that the calling party is authorized to place a call through the IP telephony system 120 using the extension telephony device. This would likely include interacting with the authorization unit 204 to verify that the obtained telephone number/unique identification number of the extension telephony device and the obtained PIN information match the information stored in the authorization unit 204.

Assuming the obtained information is verified, and the user is authorized to place a call through the IP telephony system 120 with the extension telephony device, in step S408 the extension connection unit 202 obtains the telephone number the user would like to call. This could occur in multiple different ways.

In a simple embodiment, the extension connection unit 202 prompts the user for the telephone number, and the user enters the telephone number using a keypad of the extension telephony device. The user might also speak the number, and the extension connection unit 202 would utilize speech recognition assets to interpret the user's spoken response.

In other instances, the user might be able to access a speed dial system that has been created for the user's main account with the IP telephony system 120, or which has been specifically created for the extension telephony device. For example, FIG. 3 illustrates that an extension speed dial unit 205 may be a part of the extension operations unit 200 of the IP telephony system 120.

A user could configure the extensions speed dial unit 205 so that multiple pre-stored telephone numbers correspond to predetermined numbered options for each extension telephony device. When a user calls a local access number with an extension telephony device, the extension connection unit 202 will determine the identity of the extension telephony device. The user could make a telephone number selection from the predetermined list maintained for that extension telephony device in the extension speed dial unit 205.

In more complex embodiments, the access number that was originally dialed by the user may be tied to a particular destination telephone number. If that is the case, then simply by virtue of the access number dialed by the user, the extension connection unit 202 will know what telephone number the user is attempting to reach. This concept is discussed in more detail below.

If the user is reaching the extension connection unit 202 from a mobile computing device that is running an application provided by the IP telephony system 120, the application may allow the user to easily select a telephone number from a contact list maintained on the mobile computing device. The application would then forward the telephone number on to the extension connection unit 202.

Once the extension connection unit 202 has obtained the telephone number the user wishes to reach, in step S410 the extension connection unit 202 will cause a telephone call to be setup to the desired telephone number using normal IP telephony system assets, as is well known to those of ordinary skill in the art. However, the telephone call will be established such that the called party telephone device will receive caller ID information identifying the extension telephony device. In other words, the called party will see the regular telephone number of the extension telephony device, and any associated name, as part of the caller ID information for the incoming call.

The IP telephony system 120 will create a CDR for the call, and the CDR will be updated, finalized and stored at the completion of the call. The CDR will later be used to bill the user for the call placed through the extension telephony device. For this reason, the CDR may include a field that indicates that the call was placed through a particular registered extension telephony device.

Once the call has been setup by the IP telephony system in step S410, the server that originally establishes the call may conduct an optional call transfer in step S412. The call transfer would allow the call signaling to proceed more directly between the extension telephony device and the called telephony device. When a call transfer is conducted, it would free up assets of the IP telephony system 120 for other uses.

Figure 5:
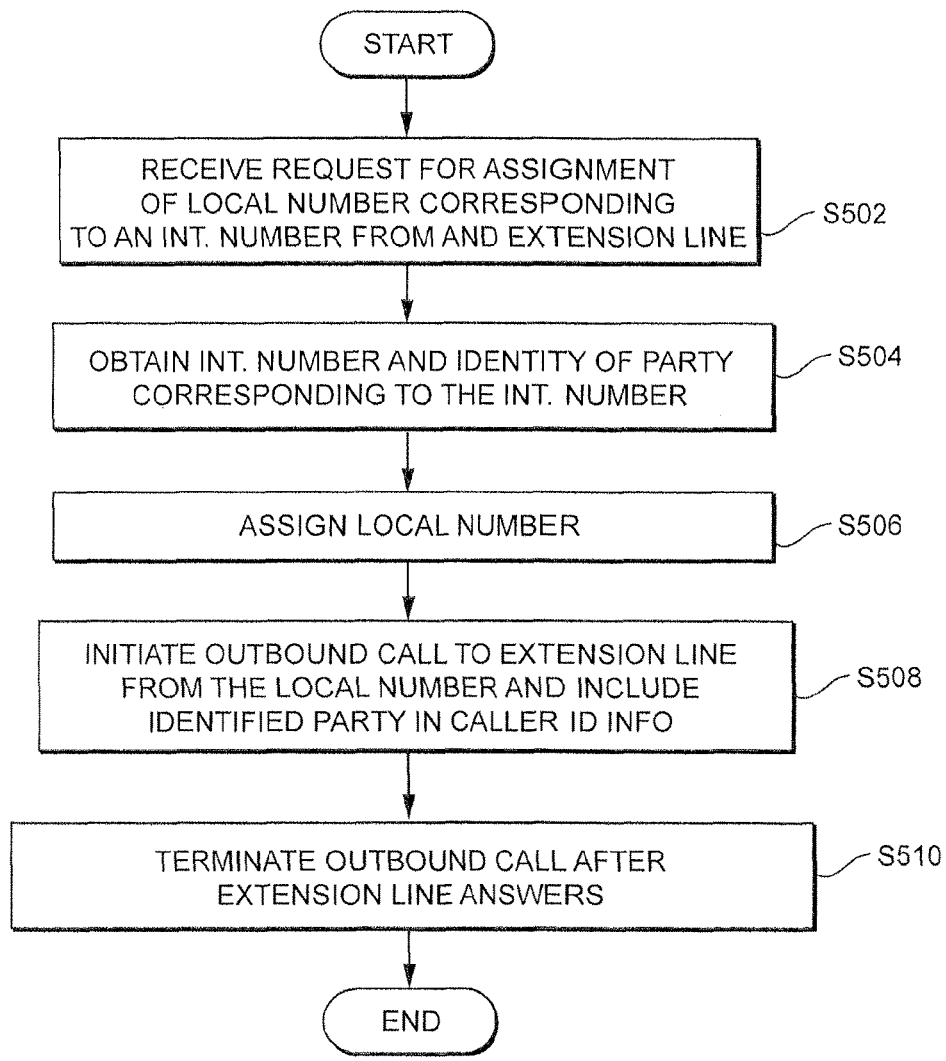
FIG. 5 is diagram illustrating steps of a method of assigning a local telephone number within a first country that a user within the first country can dial to be connected to a different telephone number in a second country.

As mentioned above, in some embodiments, the IP telephony system 120 can assign a local access number for a user to correspond to a number that the user frequently calls from his extension telephony device. For purposes of explanation, and with reference to FIG. 1, assume that the first user frequently uses his cellular telephone 134 to call his mother, who has analog telephone 152 in a different country. The first user has already registered his cellular telephone 134 as an extension telephony device with the IP telephony system 120. The first user can request that the IP telephony system assign a local access number to correspond to the telephone number assigned to his mother's analog telephone 152. Steps of a method to accomplish this assignment are illustrated in FIG. 5.

The method begins when the first user requests that a local access number be assigned to his mother's telephone number. This request would be received by the local to international telephone number assignment unit 206 of the extensions operation unit 200 of the IP telephony system 120, as shown in FIG. 3. The first user could interact with the local to international telephone number assignment unit 206 in multiple different ways. The first user could utilize a web interface, an interactive voice response system available through an access number, or the first user could speak with a customer service representative. If the first user's extension telephony device is a mobile computing device, an application running on the mobile computing device could also be used to interact with the local to international telephone number assignment unit 206.

In step S502, the local to international telephone number assignment unit 206 receives the request from the first user. In step S504, the local to international telephone number assignment unit 206 obtains the telephone number the first user wishes to be assigned, which in this case is the telephone number of his mother's analog telephone 152. The local to international telephone number assignment unit 206 also obtains the identity of the party at that telephone number, in this case, the first user's mother. In step S506, the local to international telephone number assignment unit 206 assigns a local access number that the first user can call to be connected to his mother's analog telephone 152. This number is ideally one that the first user can call from his extension telephony device without incurring any long distance or toll charges.

In step S508, the local to international telephone number assignment unit 206 initiates an outbound call to the first user's extension telephony device. The call will indicate that it has originated from the assigned local access number, and it will indicate that the call is from the first user's mother. When this information is captured by the first user's extension telephony device, it is easy for the first user to store this information in a contact list on the first user's extension telephony device. Thus, the local access number is communicated to the first user in an easy and convenient manner. In step S510, the outbound call is then terminated.

Once this process has been conduced, the first user can simply call the assigned local access number. When the call is received by the extension connection unit 202, the extension connection unit will know both the local access number that was called, and the telephone number or ID number of the first user's extension telephony device. This will allow the extension connection unit to determine the number that the first user wishes to call. The extension connection unit may then ask the first user for the PIN number assigned to the first user's extension telephony device to ensure that the user's is authorized to make the call through the IP telephony system. As soon as the user provides the PIN, the call would be connected. In some embodiments, obtaining the PIN may not occur.

As mentioned above, in some instances a user could place a call from an extension telephony device that is a smartphone or a computer or a portable computing device running appropriate software. In these instances, some or all of the communications required to inform the extension operation unit 200 of the called party's telephone number, the user's account information and a PIN number can be automated by the software. The software might also make it easier for the user to input or select a telephone number of the party the user is attempting to reach.

Figure 6:
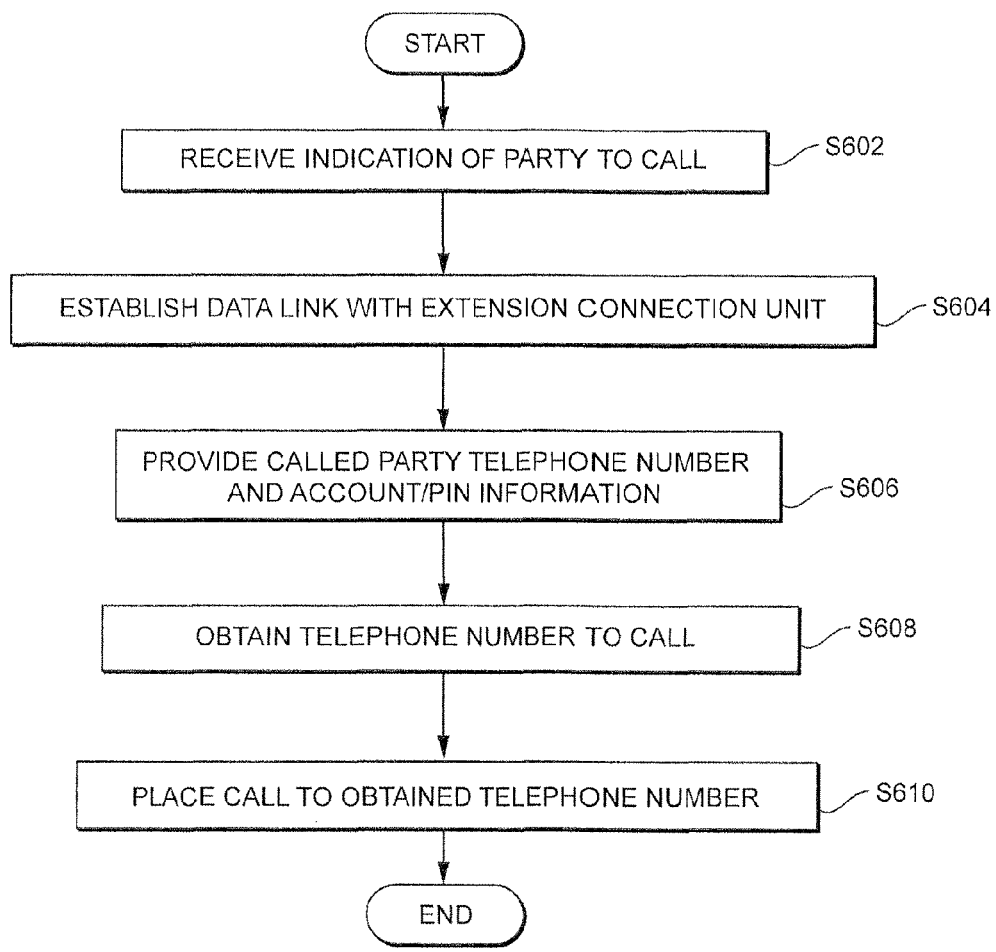
FIG. 6 is a diagram illustrating steps of a method that would be performed by software running on a smartphone or a computer that is acting as an extension telephony device to place a telephone call.

FIG. 6 illustrates steps of a method that would be performed by an application on a smartphone or software on a computer in order to place a call while the smartphone or computer is acting as an extension telephony device.

Figure 7:
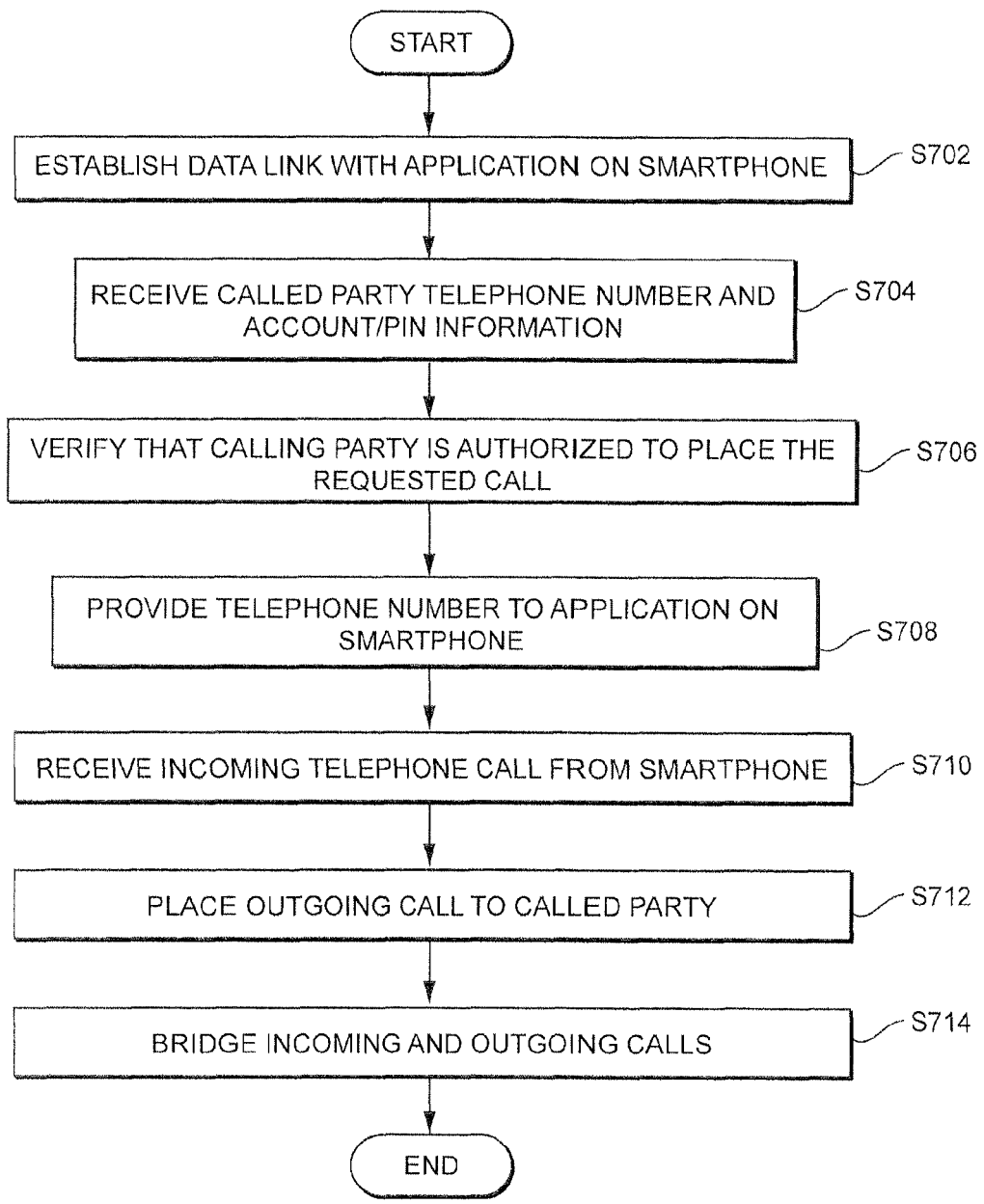
FIG. 7 is a diagram illustrating steps of a method that would be performed by an extension operations unit of an IP telephony sysem to connect a smartphone or a computer acting as an extension telephony device to a called party.

FIG. 7 illustrates steps of a method that would be performed by the extensions operation unit 202 of an IP telephony system 120 to connect such an extension telephony device to a called party. In the following description, we will assume that the user is placing a call from a smartphone that is registered as an extension telephony device under a user's main account with an IP telephony system. However, the same basic steps would be performed if the user was placing a call from a computer or a portable computing device that is acting as an extension telephony device.

The method begins when a user decides to place a call using a smartphone as an extension telephony device. The user loads and runs an application on the smartphone that automates many of the steps the user would otherwise have to perform under the methods described above. In step S602, the application receives an indication from the user as to who the user wishes to call. This could be accomplished in many different ways. The user could simply type in the number the user wishes to call on a keypad of the smartphone. Alternatively, the application could cause a keypad to be displayed on a touch sensitive display screen on the smartphone, and the user could enter the telephone number using the displayed keypad. In still other instances, the application could present the user with a list of contacts, and the user could select one of the contacts from the list. In this instance, the contact list could be a contact list that is stored on the smartphone through another separate application, or a contact list that has been input and maintained on the smartphone using the application that has been run by the user to place a call using the smartphone as an extension telephony device. The actual data that constitutes the contact list could be stored on the smartphone itself, or it could be stored on a remote server that the smartphone is able access via a data connection.

Once the application has obtained the telephone number of the called party, in step S604, the application establishes a data link with the extension connection unit 202 of the extension operations unit 200 of the IP telephony system 120, as illustrated in FIG. 3. This data link could be established using a cellular data channel or via a wireless or wired link to a public or private data network, such as the Internet. Regardless of how the data link is established, the data link will allow the application on the user's smartphone to communicate with a server that is part of the extension connection unit 202.

In step S606, the application will inform the extension connection unit 202 of the called party's telephone number.

The application may also provide the extension connection unit 202 with the telephone number of the user's smartphone, or a special identification number assigned to the user's smartphone or to the application running on the user's smartphone. This information will allow the extension connection unit to identify the user's smartphone as a registered extension telephony device.

The application may also automatically provide the extension connection unit 202 with a PIN number that was assigned to the user or to the user's smartphone or to the application loaded on the smartphone. The PIN number is used to verify the identity of the user or the smartphone for purposes of fraud prevention. In alternate embodiments, the application may require the user to enter or speak the PIN number, which would be another way of preventing an unauthorized user from placing a telephone call using someone else's smartphone.

In step S608, the application obtains a telephone number from the extension connection unit 202. Then, in step S610, the application causes the smartphone to call the telephone number it received from the extension connection unit 202. As will be explained in greater detail below, the user would then be connected to the called party.

Although the embodiment illustrated in FIG. 6 ultimately connects the user to the called party through a telephone call placed to the telephone number obtained from the extension connection unit 202, in alternate embodiments, the user may be connected to the called party in some other fashion. For example, the data link established between the user's smartphone and the extension connection unit 202 could be used to establish a VOIP call to the called party. In other instances, the application on the user's smartphone may establish a VOIP call to the called party in some other fashion, with the assistance of the extension connection unit 202.

FIG. 7 illustrates steps of a method performed by the extension operations unit 200 of the IP telephony system 120 to connect a smartphone running an application and acting as an extension telephony device to a called party. The method begins in step S702, when the extension connection unit 202 receives a communication from the application on the user's smartphone indicating that the application is attempting to place a call to a called party. In step S702, the extension connection unit 202 establishes a data link with the application on the smartphone. As noted above, this data link could be established in multiple different ways.

In step S704, the extension connection unit 202 receives several pieces of information from the application on the user's smartphone. First, the extension connection unit 202 receives either the telephone number of the user's smartphone or an identification number that was assigned to the user's smartphone or to the application running on the user's smartphone. This information is used to verify the identity of the user and to verify that the smartphone is a registered extension telephony device. The telephone number of the user's smartphone may also be used for caller ID purposes when the call is placed to the called party.

The extension connection unit 202 also receives the telephone number of the called party that the user is attempting to reach. The extension connection unit 202 may also automatically receive a PIN number from the application on the user's smartphone. Alternatively, the application may request that the user input a PIN number, and that information may then be provided to the extension connection unit 202. In still other embodiments, the extension connection unit 202 may send a query to the user, via the application on the user's smartphone, asking the user to input a PIN number. In some embodiments, the user may have the option of speaking the PIN number. In those embodiments, the application on the smartphone may interpret this spoken response, or the extension connection unit 202 may receive the audio of the spoken response, and the extension connection unit 202 may be responsible for interpreting the spoken response.

In step S706, the extension connection unit 202 verifies that the user is authorized to place the requested call. This would likely include interacting with the authorization unit 204 to verify that the obtained telephone number/unique identification number of the smartphone and the obtained PIN information match the information stored in the authorization unit 204.

If the user is authorized to place the requested call, in step S708, the extension connection unit 202 provides the application on the user's smartphone with a telephone number that the smartphone can call to be connected to the called party. At this point, the application on the user's smartphone will place a call to the telephone number obtained from the extension connection unit 202, as described above in connection with FIG. 6.

In step S710, the extension connection unit 202 receives the incoming call from the user's smartphone. The extension connection unit 202 recognizes the user's smartphone through caller ID information, and the extension connection unit will already know, from the previous information exchange with the application on the smartphone, what telephone number the user is attempting to call. In step S712, the extension connection unit 202 places an outgoing call to the called party, and in step S714, the extension connection unit 202 bridges the incoming and outgoing calls so that the user's smartphone is connected to the called party.

In some embodiments, the extension connection unit 202 waits to receive the incoming call from the user's smartphone before placing the outgoing call to the called party. In other instances, the extension connection unit begins to setup the outgoing call after it receives the called party's telephone number from the application on the user's smartphone and before it receives the incoming call from the user's smartphone. This would result in a faster connection for the user.

As noted above, in alternate embodiments, the user's smartphone may be connected to the called party in a different fashion. For example, because the extension connection unit 202 receives all required relevant information from the application on the user's smartphone via the initial data connection, the extension connection unit 202 may setup a VOIP call to the called party, and that call may be bridged to the user's smartphone using the same data connection that was used to receive information from the application on the user's smartphone. This would eliminate the need for the application to place a separate call to the telephone number provided by the extension connection unit 202.

The application on a user's smartphone, or software running on a computer or portable computing device, may provide additional functionality beyond merely allowing the user to place a call. For example, the software may also allow a user to perform a rate lookup to determine how much it will cost to place a particular call. The application may also allow a user to access his account information with the IP telephony system, and also edit or update that information. The application may also allow a user to place a text message to particular telephone number using the smartphone or computer as an extension telephony device.

In the examples given above, it was assumed that the user would already have an existing account with the IP telephony system, and that the user would have already registered a primary IP telephony device with the IP telephony system. In alternate embodiments, it is not necessary for a user to have a separate primary IP telephony device. Instead, a user would setup a new account with the IP telephony system with the intention of only registering a telephony device that is already registered with and provided service by a separate telephony service provider. This would allow the user to place calls from the telephony device using the native telephony service provider, or through the IP telephony system. In many instances, the IP telephony system may be able to provide the user with communications services at lower rates than the native telephony service provider would charge.

Also, in the examples given above, the user places a telephone call using an extension telephony device. However, the same basic procedures would be used if a user wishes to obtain other types of communications services from the IP telephony system via an extension telephony device. For example, the user could send SMS text messages, MMS messages and other forms of communications through the IP telephony system from an extension telephony device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of providing communications services, comprising:
    receiving a request for communications services from a first telephony device that is native to a first telephony system that provides cellular based telephony services, the request being received at a second telephony system that provides landline type telephony services;
    determining whether the first telephony device is associated with the second telephony system based on settings of an existing account with the second telephony system wherein the determining step includes:
        obtaining an identifier associated with the first telephony device, wherein the identifier is obtained from a software application running on the first telephony device, and
        using the identifier to determine whether the first telephony device is associated with an existing account within the second telephony system; and
    providing the requested communications services based on the result of the determining step.

2. The method of claim 1, wherein the determining step further comprises:
    obtaining an authorization code from a user of the first telephony device; and
    determining whether the authorization code matches an approved authorization code that is associated with the existing account within the second telephony system.

3. The method of claim 1, wherein the determining step further comprises:
    obtaining an authorization code from a user of the first telephony device; and
    determining whether the authorization code matches an approved authorization code that is associated with the obtained identifier.

4. The method of claim 1, wherein the providing step comprises setting up a telephone call between the first telephony device and a second telephony device, and wherein the second telephony device is provided with an identifier associated with the first telephony device.

5. The method of claim 1, wherein the providing step comprises delivering a communication from the first telephony device to a second telephony device, and wherein the communication includes an identifier associated with the first telephony device.

6. The method of claim 1, wherein the receiving step comprises answering a telephone call initiated by a user of the first telephony device that is directed to a telephone number maintained by the second telephony system.

7. The method of claim 1, wherein the receiving step comprises answering a telephone call initiated by a user of the first telephony device that is directed to a first telephone number maintained by the second telephony system and that is local to the first user, and wherein the providing step comprises setting up a telephone call between the first telephony device and a second telephony device that is assigned to a second telephone number that is not local to the user but which is correlated to the first telephone number by the second telephony system.

8. The method of claim 1, wherein the step of obtaining an identifier associated with the first telephony device comprises obtaining a unique identification number associated with the first telephony device or with the software application running on the first telephony device.

9. The method of claim 8, further comprising receiving a personal identification number associated with the first telephony device or with the existing account with the second telephony system, and wherein the unique identification number and the personal identification number are used together to determine if the first telephony device is associated with an existing account within the second telephony system.

10. The method of claim 9, wherein the unique identification number and the personal identification number are both received from the software application running on the first telephony device.

11. The method of claim 1, wherein the receiving step comprises receiving identifying information that identifies at least one of a party and a second telephony device to which a user of the first telephony device would like to send a communication, and wherein the identifying information is obtained from a software application running on the first telephony device.

12. The method of claim 11, wherein the identifying information is a telephone number of the second telephony device.

13. A system for providing communications services, comprising:
    means for receiving a request for communications services from a first telephony device that is native to a first telephony system that provides cellular based telephony services, wherein the receiving means is part of a second telephony system that provides landline type telephony services;
    means for determining whether the first telephony device is associated with the second telephony system based on settings of an existing account with the second telephony system, wherein the determining means obtains an identifier associated with the first telephony device from a software application running on the first telephony device, and wherein the determining means uses the identifier to determine whether the first telephony device is associated with an existing account within the second telephony system; and means for providing the requested communications services based on the result of the determining step.

14. A system for providing communications services, comprising:

an extension connection unit that receives a request for communications services from a first telephony device that is native to a first telephony system that provides cellular based telephony services, wherein the extension connection unit is part of a second telephony system that provides landline type telephony services;

an authorization unit that determines whether the first telephony device is associated with the second telephony system based on settings of an existing account with the second telephony system, wherein the authorizing unit obtains an identifier associated with the first telephony device from a software application running on the first telephony device, and wherein the authorization unit uses the identifier to determine whether the first telephony device is associated with an existing account within the second telephony system; and wherein the extension connection unit causes the requested communications services to be provided to the first telephony device through the second telephony system if the authorization unit determines that the first telephony device is associated with the second telephony system.

15. The system of claim 14, wherein the authorization unit obtains an authorization code from a user of the first telephony device and determines whether the authorization code matches an approved authorization code that is associated with the existing account within the second telephony system.

16. The system of claim 14, wherein the authorization unit obtains an authorization code from a user of the first telephony device and determines whether the authorization code matches an approved authorization code that is associated with the obtained identifier.

17. The system of claim 14, wherein the extension connection unit causes a telephone call to be setup between the first telephony device and a second telephony device, and wherein the second telephony device is provided with an identifier associated with the first telephony device.

18. The system of claim 14, wherein the extension connection unit causes a communication to be delivered from the first telephony device to a second telephony device, and wherein the communication includes an identifier associated with the first telephony device.

19. The system of claim 14, wherein the extension connection unit answers a telephone call initiated by a user of the first telephony device that is directed to a telephone number maintained by the second telephony system.

20. The system of claim 19, wherein the extension connection unit obtains an authorization code from the user of the first telephony device and obtains an identifier associated with a second telephony device to which the user of the first telephony device would like to send a communication.

21. The system of claim 14, wherein the extension connection unit answers a telephone call initiated by a user of the first telephony device that is directed to a first telephone number maintained by the second telephony system and that is local to the first user, and wherein the extension connection unit sets up a telephone call between the first telephony device and a second telephony device that is assigned to a second telephone number that is not local to the user but which is correlated to the first telephone number by the second telephony system.

22. The system of claim 14, wherein the second telephony system is an IP telephony system, wherein a proxy server of the IP telephony system receives the request for communications services from the first telephony device, wherein the extension connection unit causes a voice over Internet protocol telephone call to be setup between the first telephony device and a second telephony device through the proxy server, and wherein the extension connection unit causes a call transfer operation to be conducted so that the telephone call is no longer routed through the proxy server.

23. The system of claim 14, wherein the identifier associated with the first telephony device obtained by the authorization unit comprises a unique identification number associated with the first telephony device or with the software application running on the first telephony device.

24. The system of claim 23, wherein the authorization unit also obtains a personal identification number associated with the first telephony device or with the existing account with the second telephony system, and wherein the unique identification number and the personal identification number are used together to determine if the first telephony device is associated with an existing account within the second telephony system.

25. The system of claim 24, wherein the unique identification number and the personal identification number are both obtained by the authorization unit from the software application running on the first telephony device.

26. The system of claim 14, wherein the authorization unit obtains identifying information that identifies at least one of a party and a second telephony device to which a user of the first telephony device would like to send a communication, and wherein the identifying information is obtained from a software application running on the first telephony device.

27. The system of claim 26, wherein the identifying information is a telephone number of the second telephony device.

28. A method of providing communications services, comprising:

receiving a request for communications services from a first telephony device that is native to a first telephony system that provides cellular based telephony services, the request being received at a second telephony system that provides landline type telephony services;

determining whether the first telephony device is associated with the second telephony system based on settings of an existing account with the second telephony system; and providing the requested communications services based on the result of the determining step, wherein the providing step comprises sending a communication to a second telephony device, and wherein the communication includes an identifier associated with the first telephony device.

29. The method of claim 28, wherein providing the requested communications services comprises setting up a telephone call between the first telephony device and the second telephony device, and wherein during call setup, caller ID information is provided to the second telephony device, the caller ID information including a telephone number of the first telephony device.

30. The method of claim 28, wherein providing the requested communications services comprises sending a SMS or MMS message to the second telephony device, and wherein the SMS or MMS message indicates that it originates from a telephone number of the first telephony device.

* * * * *